Jan. 17, 1939. R. G. HAWKER 2,144,244
VALVE SEAT
Filed Oct. 26, 1935
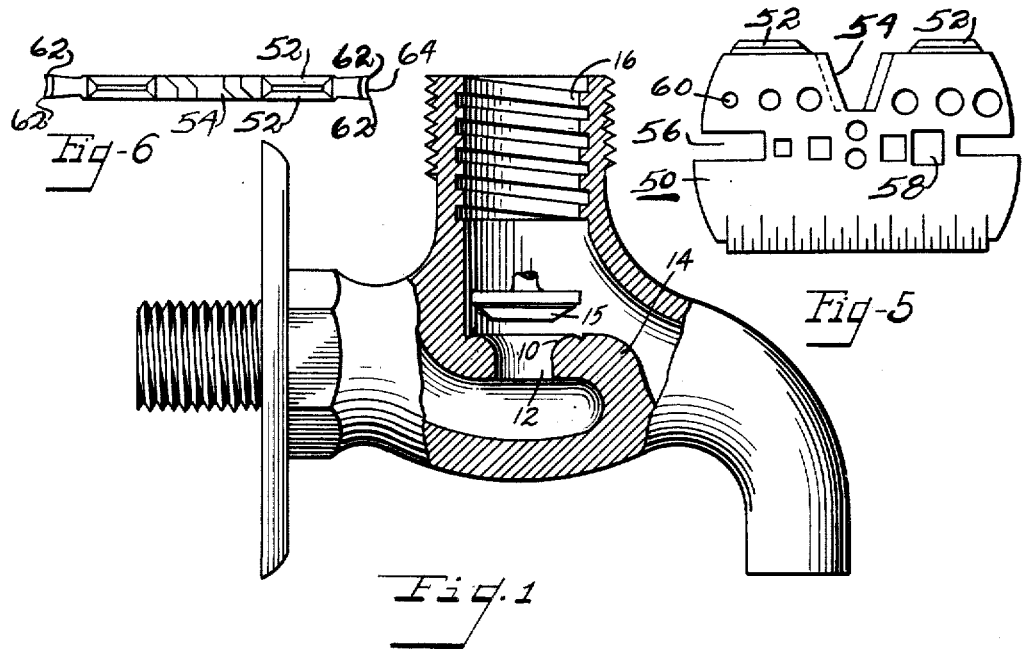
Fig. 1 / Fig. 5 / Fig. 6
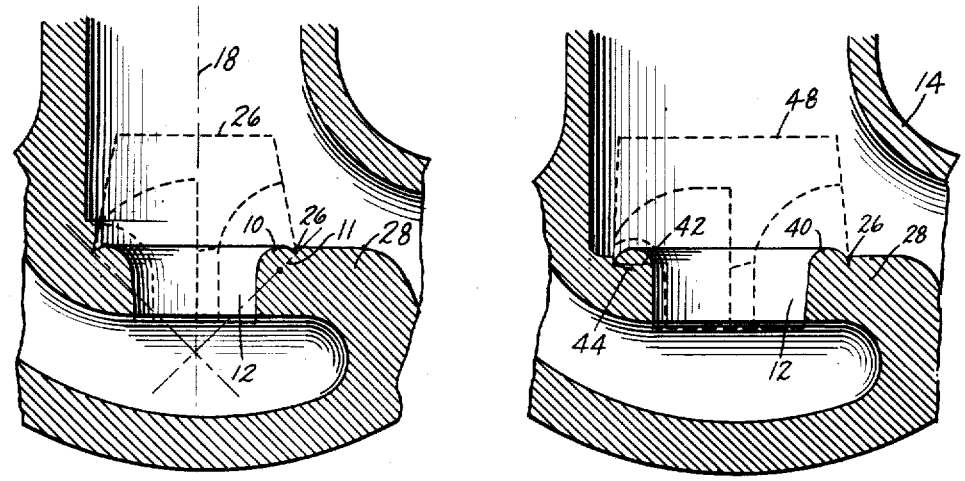
Fig. 2   Fig. 3
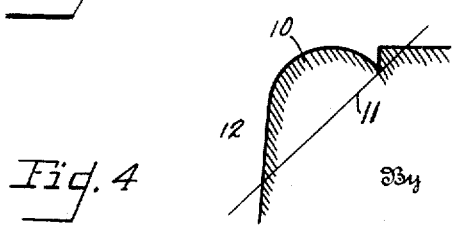
Fig. 4
Inventor
Roland G. Hawker
By Walker & Dybvig
Attorneys Patented Jan. 17, 1939

2,144,244

UNITED STATES PATENT OFFICE 2,144,244

VALVE SEAT

Roland G. Hawker, Kingfield, Maine

Application October 26, 1935, Serial No. 46,917

2 Claims. (Cl. 251—27)

This invention relates to valve seats and in more particular to valve seats formed by renewing the seating surfaces of globe valves, bibb type faucets and analogous constructions. Although a valve seat has been developed in connection with renewal seats in old faucets, the valve seat may be used equally as well on new structures. The tool for producing the valve seat has been fully described in my copending applications Serial No. 692,662 filed Oct. 7, 1933 and Serial No. 39,589 filed Sept. 7, 1935.

As disclosed in my copending applications, the tools disclosed therein are applicable to a wide range of sizes of valves and faucets with which they are detachably engageable by a suitable universal mounting. The head of the cutter when used in reseating faucets is adapted to form a contoured seat of maximum size with minimum waste of material and lost space. This seat thus formed, which comprises the dominant features of this invention, presents a comparatively large surface area to the washer of the valve. The surface area of the seat is approximately equivalent to the area of the throat of the valve or faucet. This large area is produced by utilizing the maximum diameter possible in faucets, which diameter is limited only by the width of the opening wherein the stem of the valve is mounted and the arcuate surface of the seat.

Seats with arcuate surfaces have been used in the past, as for example shown in the patent to O'Keefe No. 1,087,457 and the patent to Blair No. 1,365,449; but in each of these the maximum diameter of the arcuate surface is only slightly greater than the diameter of the throat, whereby the radius of curvature of the bead or seat is very short, so as to present a dull cutting edge piercing the washer. This makes a tight valve structure when the washer is new and the seat is smooth; but due to the cutting action of the bead, the bead soon penetrates the washer and crushes the fibers thereof. In addition thereto, this dull cutting surface becomes roughened in a short time, while it is impossible to keep the valve tight for any great length of time. In the Blair disclosure such a dull cutting edge has also been disclosed, bounded by a flat annular surface.

An object of the present invention is to provide a seat that presents a large area to the washer without the cutting action.

This has been accomplished by providing a seat whose diameter is equal to the diameter in the opening of the valve and turning the wasted space generally found next to the narrow beads into seating surfaces by spanning the seat to the extreme outer diameter of the wall of the diaphragm, or the opening in the valve or fixture with a large arc and by so doing, increasing the life of the washer and the life of the fixture by many times, as well as preventing the seat from becoming embedded into and below the surface metal of the diaphragm, thus destroying the usefulness of the seat entirely. In addition thereto, it provides approximately double the amount of drop from the height of this large arc, being more than double the diameter of the body seats formerly used and therefore increasing the clearance for the casing in which the washer is placed, as well as making it possible for providing seating surface which has been made less penetrating to wear into the washer, increasing the life and service of the washer and the fixture and providing seating surface to wear into the washer approximately twice the depth, twice as far as it possibly could if it were a small bead like that of the prior art or a small bead like some of those previously used with a ditch or flat annular surface on the outside of the bead equal or more than equal in width to the width of the small bead. Therefore, it being perfectly clear and obvious to anyone that the present seat, spanning the entire diaphragm instead of just a small bead, or subdividing it into a small bead and a flat surface outside of the bead, the present invention has accomplished a plurality of purposes entirely different in principle from the prior art and a radical departure from the same and a real achievement in the service and life of both the washer and the fixture.

Another object of this invention is to provide a seat that is easily produced, wears well, lasts long and cooperates with the washer to form a seal.

Another object of my invention is to provide a seat, the bearing surface of which is approximately equal to or greater than the area of the throat of the valve fixture.

Another object of this invention is to provide a seat wherein the fluid flowing through the valve when open follows a gently curved surface, so as to eliminate chattering and obnoxious noises.

Another object of this invention is to provide an arcuate seat subtending a cord substantially coincident with the extreme radius of curvature.

Another object of this invention is to provide an arcuate surface for the seat subtending a cord that when extended forms an angle of substantially 45° with the axis of the throat.

Another object of this invention is to provide a trimming device for flush valve seats.

With the above primary and other incidental objects in view, as will more fully appear in the specification, the invention consists of the features of construction, the parts and combinations thereof, and the mode of operation, or their equivalents, as hereinafter described and set forth in the claims.

In the drawing

Fig. 1 discloses a faucet shown with my 45° angle seat.

Fig. 2 shows the same seat as applied to a valve, only a portion of the valve being shown.

Fig. 3 discloses a seat, the arcuate surface of which subtends a horizontal cord, as viewed in Fig. 3.

Fig. 4 discloses a fragmentary schematic view of one side of the throat of the valve.

Fig. 5 discloses a plan view of a combination tool including flush valve trimming cutters.

Fig. 6 shows another modification of a combination tool as seen from one edge.

Referring to the disclosure shown in the drawing, the arcuate seat 10 merges into a tapered throat 12 of a valve or faucet 14. The maximum diameter of the valve seat is substantially equal to the opening 16 of the faucet shown in Fig. 1. The extreme radius 11 when extended forms a 45° angle with the axis of the throat 18, as shown in Fig. 2 and Fig. 4. The total area of this arcuate seat 10 is substantially equal to the area of the opening of the throat, thereby presenting a large surface area to the washer. When the extreme radius 11 extended forms an angle of substantially 45° to the axis of the throat, the washer 15 is preferably frustrum conical in shape, so as to utilize the entire curvature of the seat, or substantially so. When the washer is new only a small portion of the arcuate seat contacts the washer. When the washer is used over a longer period of time, it gradually accommodates itself to the seat so as to present a surface in contact with practically the entire arcuate surface, thereby utilizing practically all the material in the washer to advantage before it is necessary to replace the washer.

The seat 10 has a large radius of curvature, whereby the arcuate surface 10 presents a blunt and comparatively flat surface to the washer 15. The points of the cutter 26 shown in dotted line in Fig. 2 does not penetrate a great distance into the diaphragm 28, thus permitting the reseating of a valve with a comparatively thin diaphragm.

Where the diaphragm is sufficiently thick an arcuate seat like that disclosed in the modification shown in Fig. 3 may be used. In this modification the arcuate surface 40 subtends a horizontal cord 42, substantially coinciding with the extreme radius of curvature 44. This is permissible when the diaphragm is sufficiently thick. This modification permits the use of either a frustrum conical or a flat washer.

The cutter 48 used for cutting such a seat may be shaped similar to the dot-dash lines 48 and more fully described in my copending application. Again, the total surface of the arcuate seat 40 is substantially equal to the area of the throat, thereby utilizing a large surface in contact with the washer. For a throat having a ¾" diameter, the maximum diameter of the seat may be approximately 1". Due to the curvature and the diameter of the seat, the surface available for contact with the washer is substantially equal to the area of the throat opening.

From the foregoing it is readily apparent that a large arcuate surface is presented to the washer, which results in the maximum use of the washer and a metallic contacting surface that remains smooth. This is especially noticeable when high fluid pressures are under control of the valve or the faucet.

The smooth path for the fluid reduces and in most cases completely eliminates chattering or whistling faucets and valves, thereby eliminating a very annoying source of noise.

In Figs. 5 and 6 two modifications of a combination tool have been shown that are similar to the combination tool disclosed in my copending application Serial No. 39,589 filed Sept. 7, 1935 for Bibb seating tool.

The combination tool 50 is provided with a pair of bevelled edges 52 subtending a V-shaped notch 54. The edges 52 may be utilized to engage the kerf of screws, thus functioning as a screw driver. The V-shaped notch 54 may be used to remove a bibb seating tool as more fully described in my copending application. The slots 56, the square openings 58 and the round holes 60 may be used as gauges.

The ends of the tool are arcuate and hollowed at 64 so as to form two pairs of cutting edges 62 on each side of the horizontal medial plane, as viewed in Fig. 5. As may be best seen by referring to Fig. 6, the sides of the tool may be hollowed at 64 to provide keener cutting edges. The radius of curvature of the edges above the horizontal medial plane in Fig. 5 is less than the radius of curvature of the edges below the plane. This permits the use of the upper cutting edges to trim a small flush valve seat and the lower cutting edges for a larger flush valve seat.

In operation the combined tool is manually inserted into a flush valve seat with the proper cutting edges selected for the particular valve seat and the tool rotated manually to thereby scrape the seat removing foreign matter, such as scale and the like and smoothing the metallic surface, so as to remove ridges, burrs and other irregularities.

The flush valve tool cuts above center regardless of whether it is turned to the right or to the left. It may be operated in either direction.

It may be seen that this flush valve tool is merely a tool with two cutting edges in operation at one time on the work. This is not true. This tool has four cutting edges positively and absolutely and this fact is what largely attributes to the successful operation of this tool. This tool has four contacting cutting edges engaging the work at one time instead of two cutting edges contacting the work at one time. This helps to center the tool on the work. This steadies the tool in its cutting action on the work. The first cutting edge on each side of the flush valve tool takes the cut in advance of the edge in back of it. The edge in back of it being of the same depth but with far less clearance by reason of the form of hollow grinding is in actual contact with the work throughout the entire operation of the tool and does not only help to center and steady the tool by reason of the edges on each side of the tool being at opposite sides from the cutting edges, but they actually follow up the advanced cutting edges with a scraping contact on the work. This is of tremendous advantage.

This tool is not used entirely by hand. It is also used successfully when held in an extension with a brace or in an electric drill. This tool is simply held in an extension shaft which is of a diameter and form on one end to be held in a brace or electric drill chuck. The other end of the extension shaft is simply slotted having a slot of sufficient width and length and being cut central in the extension shaft to admit the flush valve tool being placed in this slot by a pin which is placed in one of the two holes which are located in a central position in this flush valve tool. This extension shaft is made of sufficient length to reach down on to the flush valve seat when in position in a closet tank so as to be able to renew the seat on the flush valve without removing the flush valve from the closet tank.

From the above description it will be apparent that there is thus provided a device of the character described possessing the particular features of advantage before enumerated as desirable, but which obviously is susceptible of modification in its form proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In a valve structure, an inlet passage, an outlet passage, a throat interconnecting the inlet and outlet passages, a closure for the throat, an opening for receiving actuating mechanism for the valve, and a seat associated with the throat and with which the closure cooperates to effect closure of the throat, said seat having a smooth arcuate annular bearing surface surrounding the throat, the outer diameter of said annular surface being substantially equal to the opening for receiving the actuating mechanism to provide a bearing surface substantially equal to the area of the throat, the extreme radii of the arcuate surface when extended forming angles of 45° with the longitudinal axes of the throat, and the valve closure having its seat contacting face angled to rest on the seat over an area substantially equal to the area of the throat when the valve is in closed condition.

2. In a valve structure, an inlet passage, an outlet passage, a throat interconnecting the inlet and outlet passages, a closure for the throat, an opening for receiving actuating mechanism for the valve, and a seat associated with the throat and with which the closure cooperates to effect closure of the throat, said seat having a smooth arcuate annular bearing surface surrounding the throat, and having an outer diameter substantially equal to that of the opening for receiving the valve actuating mechanism to provide a bearing surface having an area substantially equal to the area of the throat, the extreme radii of the arcuate surface when extended forming angles of 45° with the longitudinal axes of the throat, and the valve closure having its seat contacting face angled to rest on the seat over an area substantially equal to the area of the throat when the valve is in closed condition, and valve actuating mechanism extending through the opening therefor and operatively connected with the closure.

ROLAND G. HAWKER.

CERTIFICATE OF CORRECTION.

Patent No. 2,144,244.                      January 17, 1939.

ROLAND G. HAWKER.

It is hereby certified that error appears in the printed specification of the above numbered patent requiring correction as follows: Page 1, first column, line 45, for the word "while" read when; page 2, second column, line 48, for "be seen" read seem; and that the said Letters Patent should be read with this correction therein that the same may conform to the record of the case in the Patent Office.

Signed and sealed this 14th day of March, A. D. 1939.

Henry Van Arsdale.

(Seal)                                Acting Commissioner of Patents.

brace or electric drill chuck. The other end of the extension shaft is simply slotted having a slot of sufficient width and length and being cut central in the extension shaft to admit the flush valve tool being placed in this slot by a pin which is placed in one of the two holes which are located in a central position in this flush valve tool. This extension shaft is made of sufficient length to reach down on to the flush valve seat when in position in a closet tank so as to be able to renew the seat on the flush valve without removing the flush valve from the closet tank.

From the above description it will be apparent that there is thus provided a device of the character described possessing the particular features of advantage before enumerated as desirable, but which obviously is susceptible of modification in its form proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In a valve structure, an inlet passage, an outlet passage, a throat interconnecting the inlet and outlet passages, a closure for the throat, an opening for receiving actuating mechanism for the valve, and a seat associated with the throat and with which the closure cooperates to effect closure of the throat, said seat having a smooth arcuate annular bearing surface surrounding the throat, the outer diameter of said annular surface being substantially equal to the opening for receiving the actuating mechanism to provide a bearing surface substantially equal to the area of the throat, the extreme radii of the arcuate surface when extended forming angles of 45° with the longitudinal axes of the throat, and the valve closure having its seat contacting face angled to rest on the seat over an area substantially equal to the area of the throat when the valve is in closed condition.

2. In a valve structure, an inlet passage, an outlet passage, a throat interconnecting the inlet and outlet passages, a closure for the throat, an opening for receiving actuating mechanism for the valve, and a seat associated with the throat and with which the closure cooperates to effect closure of the throat, said seat having a smooth arcuate annular bearing surface surrounding the throat, and having an outer diameter substantially equal to that of the opening for receiving the valve actuating mechanism to provide a bearing surface having an area substantially equal to the area of the throat, the extreme radii of the arcuate surface when extended forming angles of 45° with the longitudinal axes of the throat, and the valve closure having its seat contacting face angled to rest on the seat over an area substantially equal to the area of the throat when the valve is in closed condition, and valve actuating mechanism extending through the opening therefor and operatively connected with the closure.

ROLAND G. HAWKER.

CERTIFICATE OF CORRECTION.

Patent No. 2,144,244.                       January 17, 1939.

ROLAND G. HAWKER.

It is hereby certified that error appears in the printed specification of the above numbered patent requiring correction as follows: Page 1, first column, line 45, for the word "while" read when; page 2, second column, line 48, for "be seen" read seem; and that the said Letters Patent should be read with this correction therein that the same may conform to the record of the case in the Patent Office.

Signed and sealed this 14th day of March, A. D. 1939.

Henry Van Arsdale.

(Seal)                      Acting Commissioner of Patents.